(12) United States Patent
Ghosh et al.

(10) Patent No.: US 11,977,468 B2
(45) Date of Patent: May 7, 2024

(54) AUTOMATIC PROFILING OF APPLICATION WORKLOADS IN A PERFORMANCE MONITORING UNIT USING HARDWARE TELEMETRY

(71) Applicant: Intel Corporation, Santa Clara, CA (US)

(72) Inventors: Rahuldeva Ghosh, Portland, OR (US); Zheng Zhang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/539,701

(22) Filed: Dec. 1, 2021

(65) Prior Publication Data

US 2022/0091960 A1   Mar. 24, 2022

(51) Int. Cl.
*G06F 11/34*   (2006.01)
*G06F 21/56*   (2013.01)

(52) U.S. Cl.
CPC ...... *G06F 11/3466* (2013.01); *G06F 11/3409* (2013.01); *G06F 11/3438* (2013.01); *G06F 21/566* (2013.01)

(58) Field of Classification Search
CPC .............. G06F 11/302; G06F 11/3409; G06F 11/3433; G06F 11/3438; G06F 11/3466; G06F 21/566; G06F 21/567; G06F 2201/865; G06F 2201/88; G06N 20/00
USPC ........................................................ 702/186
See application file for complete search history.

(56) References Cited

U.S. PATENT DOCUMENTS 10,771,580 B1 *  9/2020  Khosrowpour ......... G06F 9/505
2005/0132336 A1 *  6/2005  Gotwals .............. G06F 11/3604
                                                                    702/182

* cited by examiner

*Primary Examiner* — John H Le
(74) *Attorney, Agent, or Firm* — NICHOLSON DE VOS WEBSTER & ELLIOTT LLP

(57) ABSTRACT

A performance monitoring unit of a processor includes one or more performance monitoring counters, and a behavioral detector to sample data from a set of the one or more performance monitoring counters, analyze the sampled data, and identify a type of workload of a software process being executed by the processor.

21 Claims, 5 Drawing Sheets

AUTOMATIC PROFILING OF APPLICATION WORKLOADS IN A PERFORMANCE MONITORING UNIT USING HARDWARE TELEMETRY

FIELD

Embodiments relate generally to computer processors, and more particularly, to automatic profiling of application workloads in a performance monitoring unit of a processor in a computing system using hardware telemetry.

BACKGROUND

Profiling execution of application workloads with reference to central processing unit (CPU) telemetry data (e.g., using performance monitoring unit (PMU) counters) to detect a functional payload type of the workload (e.g., video conferencing, word editing, media playback, outlook, gaming, malware, artificial intelligence (AI)/machine learning (ML), etc.) is a software-based process today with the data processing being done in the operating system (OS) space. This leads to inaccuracies due to telemetry sampling restrictions, introduces security vulnerabilities and adds significant performance overhead penalties.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Figure 1:
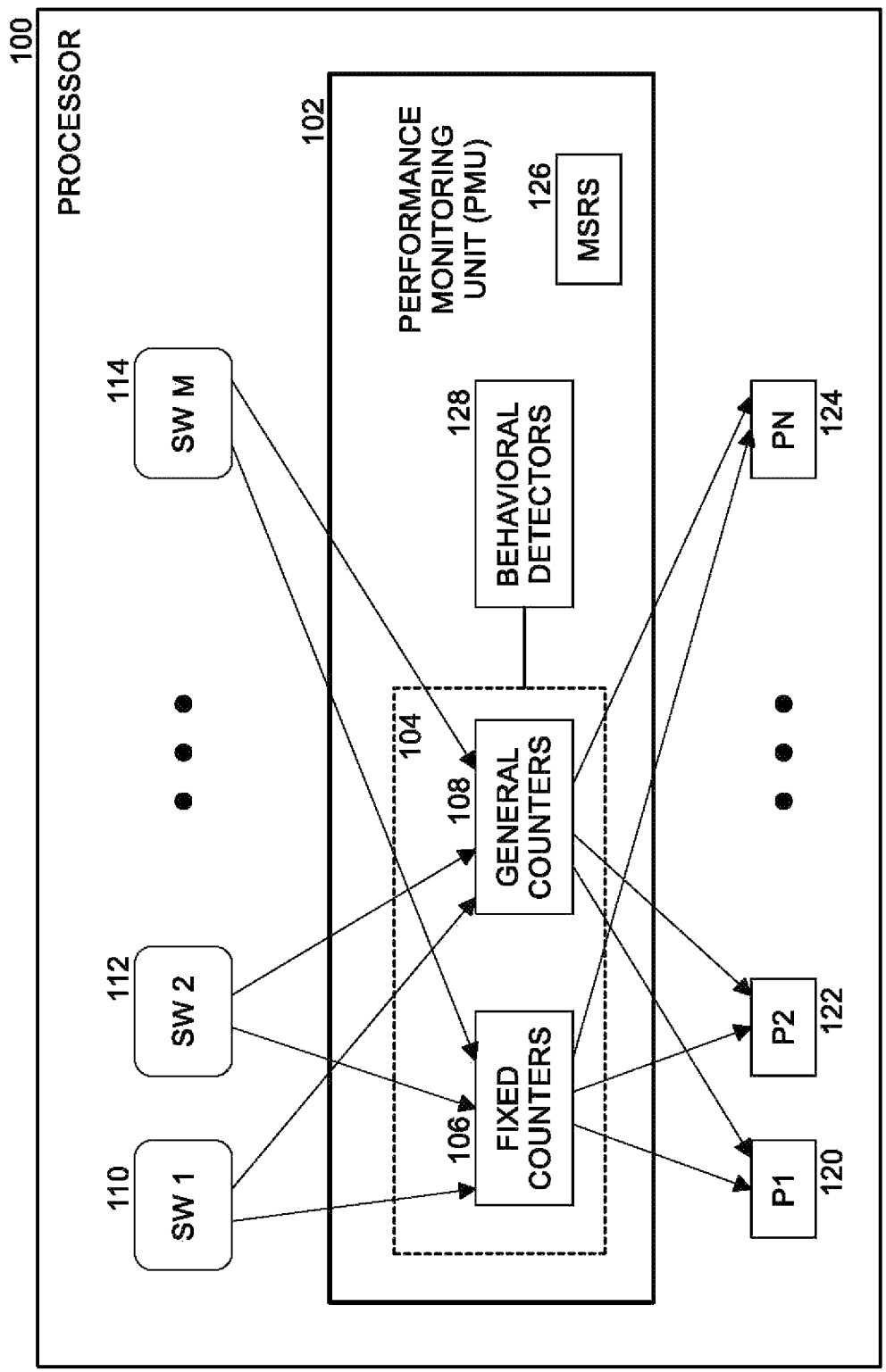
FIG. 1 is a diagram of a processor including a performance monitoring unit (PMU) according to some embodiments.

Implementations of the technology described herein provide a method and system to automatically monitor and profile activity of execution of a software (SW) process, based at least in part on hardware telemetry data, by a performance monitoring unit (PMU) of a processor, for runtime workload type identification and processor performance optimization, and detection of malware.

Embodiments disclose a method for aggregating and processing telemetry data collected in counters in the PMU of the processor for automatically profiling execution behavior by SW processes running in the OS space. The processor supports in-hardware (HW) detection of activities of interest, such as cache manipulation, encryption operations, hashing, file input/output (I/O) operations, media codec processing, artificial intelligence (AI) processing, office applications usage, video conferencing, malware, ransomware, viruses, worms, etc. The processor in response to detection of a workload type can take predetermined default actions to either optimize or halt the SW process's activity depending on its nature (e.g., benign or malware). Management SW or security SW may be notified to take further actions as desired.

In an embodiment, the PMU is loaded with one or more automatic profiling circuitry or firmware, called behavioral detectors herein, for automatically detecting a specific set of workload execution behaviors. In an embodiment, detected execution behaviors correspond to types of workloads. In an embodiment, behavioral detectors are implemented as processor firmware (e.g., microcode) and may be added/updated via firmware updates to the PMU in the processor. In another embodiment, out-of-band methods to add new behavioral detectors to the PMU at runtime can also be provided.

A SW process being executed by the processor activates a desired one or more behavioral detectors by setting one or more of a set of associated model specific registers (MSRs) in the PMU. In an embodiment, the SW process activating the one or more behavioral detectors is the operating system (OS). In other embodiments, any SW process with sufficient privileges to access the PMU MSRs can activate one or more behavioral detectors.

Once activated via MSR configuration, the behavioral detectors automatically aggregate a set of one or more PMU counters and start executing profiling logic within the behavioral detector to identify if the data collected in PMU counters during execution of SW processes running in the OS space match stored execution behavior coded in any of the activated behavioral detectors.

Behavioral detectors may cause a predetermined default response action to be taken by the processor when a profile match occurs (e.g., video conferencing activity is determined, or undesired cache manipulation activity is determined). For example, the processor can automatically tune specific processor parameters and resources to optimize performance of the detected activity by a SW process, such as optimizing processing by the processor for game play if gaming activity is detected or for media activity if high definition (HD) video playback is detected.

SW processes can also subscribe to detection results by one or more behavioral detectors by reading dedicated sets of MSRs of the PMU and take their own actions based on detected workload type.

FIG. 1 is a diagram of a processor 100 including a PMU 102 according to some embodiments. Processor 100 includes any number of hardwired or configurable circuits, some or all of which may include programmable and/or configurable combinations of electronic components, semiconductor devices, and/or logic elements that are disposed partially or wholly in a personal computer (PC), server, mobile phone, tablet computer, or other computing system capable of executing processor-readable instructions. PMU 102 circuitry includes any number and/or combination of any currently available or future developed electronic devices and/or semiconductor components capable of monitoring one or more performance aspects and/or parameters of processor 100. PMU 102 may have any number and/or combination of performance monitoring counters 104. Counters 104 are used to count events that occur during processing by processor 100. In embodiments, PMU 102 includes circuitry to monitor, track, and/or count processor activity. For example, in an Intel® processor, PMU 102 circuitry may be at least partially included or otherwise embodied in a performance monitoring unit (PMU).

In some implementations, PMU 102 may include one or more configurable or programmable elements, such as one or more configurable integrated circuits, capable of executing machine-readable instruction sets that cause the configurable or programmable elements to combine in a particular manner to create the PMU 102 circuitry. In some implementations, the PMU 102 circuitry may include one or more stand-alone devices or systems, for example, the PMU 102 circuitry may be embodied in a single surface- or socket-mount integrated circuit. In other implementations, the PMU 102 circuitry may be provided in whole or in part via one or more processors, controllers, digital signal processors (DSPs), reduced instruction set computers (RISCs), systems-on-a-chip (SOCs), application specific integrated circuits (ASICs) capable of providing all or a portion of processors 100.

The counters 104 may include any number and/or combination of currently available and/or future developed electrical components, semiconductor devices, and/or logic elements capable of monitoring, tracking, and/or counting events in processor 100. Counters 104 include fixed counters 106 and general counters 108. Fixed counters 106 include a plurality of counters that are permanently assigned to monitor, track, and/or count specified events occurring in processor 100. General counters 108 include a plurality of counters that may be programmed by firmware to monitor, track, and/or count defined events or conditions occurring in processor 100.

In an embodiment, processor 100 includes a plurality of processing cores P1 120, P2 122, . . . PN 124, where N is a natural number. Processing cores P1 120, P2 122, . . . PN 124 may read and/or write any of the fixed counters 106 and/or general counters 108. PMU 102 includes a plurality of model specific registers (MSRs) 126 to store information to be read and/or written by the plurality of processing cores P1 120, P2 122, . . . PN 124.

Processor 100 executes instructions for a plurality of SW processes SW 1 110, SW 2 112, . . . SW M 114, where M is a natural number. The SW processes may read and/or write MSRs 126.

In an embodiment, processor 100 includes a PMU 102 including behavioral detectors 128 circuitry to automatically access data stored in fixed counters 106 and general counters 108, sample and analyze the counter data by comparing the counter data to stored data sets and determine if the activity of an executing SW process, as represented by data stored in one or more counters, substantially matches a stored data set. As used herein, a substantial match is a match within a specified threshold of variance. When a substantial match occurs, a behavioral detector may indicate the match and PMU 102 may take action in response thereto or notify another entity within processor 100 or in SW being executed by processor (e.g., the OS).

The behavioral detectors 128 circuitry may include any number and/or combination of currently available and/or future developed electrical components, semiconductor devices, and/or logic elements capable of managing secure counter groups. In an embodiment, the behavioral detectors 128 circuitry may be formed by the execution of machine-readable instruction sets associated with an application and/or service executed in ring 0 kernel space. In embodiments, PMU 102 may provide some or all the behavioral detectors 128 circuitry. In other embodiments, the processor 100 may provide some or all the behavioral detectors 128 circuitry upon executing one or more machine readable instruction sets.

Although not depicted in FIG. 1, in embodiments, a memory or similar storage device may be coupled to the PMU 102 circuitry. The PMU 102 may cause the storage of some or all the data from counters 104 in the memory or similar storage device. In at least some embodiments, some or all the data stored in the memory or similar storage device may be accessible to a user of processor 100. The PMU 102 may also cause the storage of data sets representing known behaviors by SW processes during execution by processor 100. The data sets may include data from one or more counters while the processor executed representative workloads (e.g., malware, video decoding, encryption, gaming, etc.). In an embodiment, data sets may be developed over time by the PMU based at least in part on the processor executing different types of workloads over time.

Figure 2:
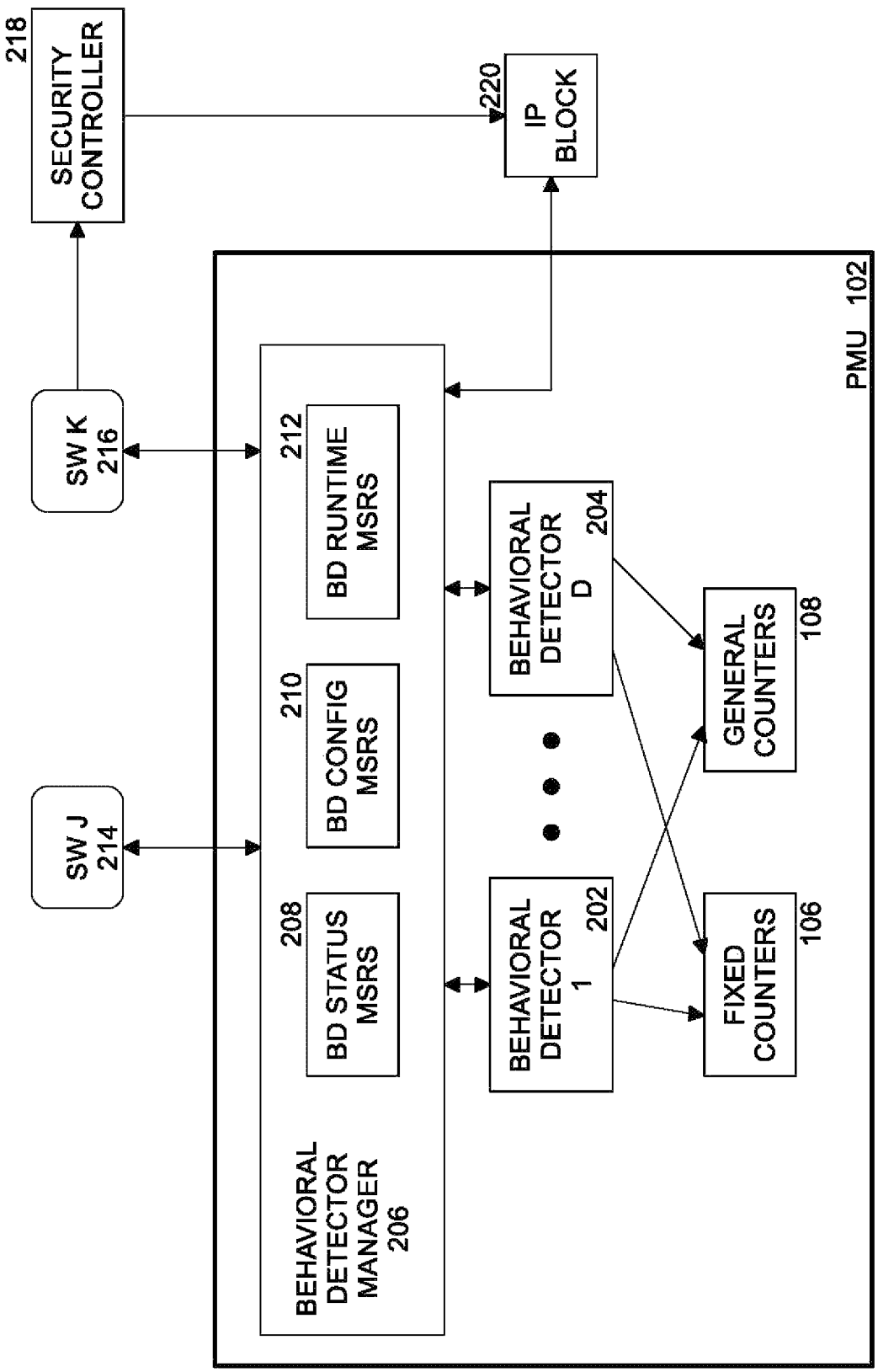
FIG. 2 is a diagram of a PMU arrangement including behavioral detectors according to some embodiments.

FIG. 2 is a diagram of a PMU arrangement 200 including behavioral detectors according to some embodiments. PMU 102 may include any number of behavioral detectors. For example, PMU 102 may include behavioral detector 1 202, . . . behavioral detector D 204, where D is a natural number. Each behavioral detector is configured to detect a specific behavior by a SW process (e.g., a type of workload) when executed by processor 100. For example, behavioral detector 1 202 may be configured to detect that the activity of SW process J 212, when executed by the processor, matches the typical activity of malware. In another example, SW process K 214, when executed by the processor, matches the typical activity of a video game. In response, PMU 102 may indicate such activity to processor 100, which in response may update operating parameters of the processor to improve performance for the detected activity (e.g., for gaming, video streaming, etc.) or restrict access to memory and storage or otherwise inhibit performance (e.g., for malware).

In embodiments, a behavioral detector is configured (e.g., by a designed circuit or encoded firmware) to detect specific application behavior by a SW process and take a default response action to either optimize or halt execution of the SW process, depending on the nature of the application's behavior. Behavioral detector manager 206 is responsible for managing the creation, deletion and runtime activity of the behavioral detectors via associated MSRs. Behavioral detectors use specialized logic to correlate the data from multiple PMU counters (e.g., fixed counters 106 and/or general counters 108) to infer if a specific SW process matches the execution pattern (as represented by a stored data set of previous counter data) that the behavioral detector was configured to detect.

Behavioral detectors are activated and deactivated through setting of model specific registers (MSRs). Activating a behavioral detector automatically groups a set of one or more counters needed by the behavior detector to detect a specific behavior. For example, behavioral detector 1 202 groups zero or more fixed counters 106 and zero or more general counters 108 to provide data to support automatic profiling activity by the behavioral detector.

Processor 100 can support a plurality of behavioral detectors which may come preloaded in processor firmware and can be augmented and/or updated via firmware or SW updates.

In an embodiment, execution of the behavioral detector's profiling logic is performed by the PMU 102 in the processor 100 and the PMU monitors the set of SW processes looking for specific execution behavior as represented in data from the counters. When a behavioral detector finds a match, the behavioral detector performs any default response action as specified in the configuration of the behavioral detector.

Some examples of application behavior monitored for by behavioral detectors and associated default actions include:

| Application Behavior | Example Default Behavioral Detector Action |
|---|---|
| Video conferencing | Tune processor parameters to optimize application execution |
| Word editing | Tune processor parameters to optimize application execution |
| Media playback | Tune processor parameters to optimize application execution |
| Office applications (email, calendar, spreadsheets, etc.) | Tune processor parameters to optimize application execution |
| Gaming | Tune processor parameters to optimize application execution |
| AI/ML (training, inference) | Tune processor parameters to optimize application execution |
| Cryptographic operations-Ransomware | Generate fault to terminate associated process |
| Excessive I/O resembling memory attacks | Inject microarchitectural noise to thwart attack |
| Cache manipulation resembling cache-based timing attacks | Inject microarchitectural noise and/or tune processor parameters to thwart attack |

The application behavior and associated default actions in the above table are for example purposes only. In other embodiment, other behaviors may be detected and other actions may be taken.

When a behavioral detector finds an application behavior match, an associated MSR is updated and an interrupt raised to notify a SW process (for example, the OS kernel) that the SW process can choose to take additional follow up actions.

Some behavioral detectors may require or benefit from additional machine learning (ML) processing of the counter data of the PMU 102 for improved profiling. This processing may be provided by one or more intellectual property (IP) blocks 220 on processor 100. For example, signed ML modules (e.g., ML shaders for graphics processing units (GPUs), and/or deep learning (DL) models for in-System on a Chip (SoC) accelerators, such as a gaussian and neural accelerators (GNAs), may be included in IP block 220. To enable ML-aided behavioral detectors, monitoring SW running on processor 100 may upload the appropriate ML models to the accelerator (e.g., GPU, GNA, etc.) in IP block 220 through secure channels where the models can be verified. In an embodiment, a secure channel for this purpose may be provided by security controller 218. In various embodiments, security controller 218 may be implemented as a converged security management engine (CSME), an enhanced security engine (ESE), a hardware security processor (HSP) (e.g., Pluton available from Microsoft® or Titan available from Google® for client devices) or a baseboard management controller (BMC) (for servers). The behavioral detector forwards aggregated PMU counter data through dedicated HW channels to the integrated ML processing unit (GPU, GNA, etc.) where the uploaded model further processes the PMU counter data to aid in behavior detection and generation of response actions. Results from computation by the IP block 220 may be sent back to behavioral detector manager 206 for additional action.

The PMU 102 include at least three sets of MSRs. In an embodiment, behavioral detector manager 206 manages access to these MSRs. Behavioral detector (BD) configuration MSRs 210 enable activation of one or more of the behavioral detectors that implement behavioral detection (e.g., profiling of workload type) functions. BD status MSRs 208 enable checking of the status of the activated behavioral detector modules. It is possible that the PMU 102 is unable to activate a configured behavioral detector due to resource limitations and the BD status MSRs 208 allow a SW process (such as the OS) to check if a configured behavioral detector is in an active state. BD runtime MSRs 212 are used to notify a SW process (such as the OS) if a behavioral detector detected the execution of application behavior that the behavioral detector is configured to detect. In an embodiment, writing to one of the BD runtime MSRs 212 generates a performance monitoring interrupt (PMI) to notify a SW process (such as the OS) that a match has been detected by a behavioral detector. The availability, details and specific bit values for behavioral detector activation may be documented in a software developer manual for processor 100 or in reference software development kits (SDKs) published by the manufacturer of processor 100.

Figure 3:
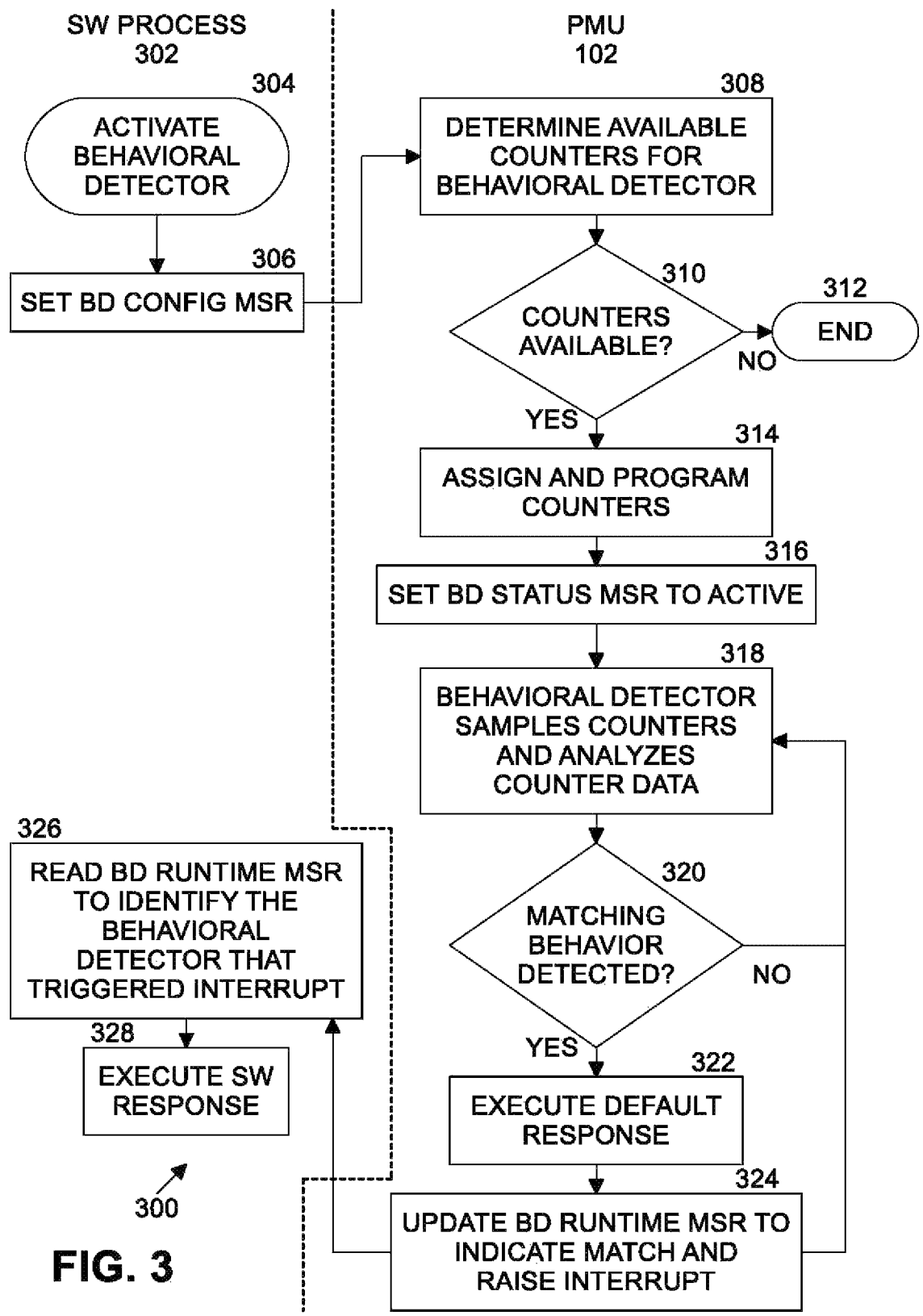
FIG. 3 is a flow diagram of activating automatic profiling processing according to some embodiments.

FIG. 3 is a flow diagram of activating automatic profiling processing 300 according to some embodiments. At block 304, a SW process 302 (such as SW 1 110, SW 2 112, . . . SW M 114 of FIG. 1) seeks to activate a selected behavioral detector in the PMU 102. At block 306, the SW process communicates with behavioral detector manager 206 of PMU 102 to set a BD configuration (config) MSR 210 associated with the behavioral detector to be activated. Behavioral detector manager 206 determines, at block 308, whether the PMU resources needed to run the selected behavioral detector in the PMU are available. In an embodiment, the resources include zero or more fixed counters 106 and/or zero or more general counters 108 needed by the selected behavioral detector. If the counters are not available at block 310 (for example, they may be in use by another behavioral detector), then activation of the selected behavioral detector is done at end block 312. If the counters are available at block 310, then at block 314 behavioral detector manager 206 assigns and programs the counters to record data relating to events needed by the selected behavioral detector to perform automatic profiling processing. In an embodiment, once one or more counters are configured for the selected behavioral detector, the counters cannot be updated by the SW process until the selected behavioral detector is deactivated. In an embodiment, processor 100 may be configured to assign counters for use by a behavioral detector.

At block 316, behavioral detector manager 206 sets the BD status MSR for the selected behavioral detector to active and causes the selected behavior detector to activate. At block 318, the selected behavioral detector samples the counters assigned to it at block 314 and analyzes the counter data to detect execution of a SW process that matches a stored data set. In an embodiment, this analysis may be performed, at least in part, by machine learning (ML) processing executed by an IP block 220. At block 320, if matching behavior is detected, then at block 322 one or more of the selected behavioral detector, behavioral detector manager 206 and/or PMU 102 executes a default response. For example, the response may include tuning parameters of processor 100 to improve performance for the SW process that matched the stored data set. At block 324, behavior detector manager 206 updates the BD runtime MSR 212 associated with the selected behavioral detector to indicate the match and raises an interrupt (e.g., a PMI), wherein handling of the PMI results in termination of the SW process associated with the detected behavior (e.g., for malware behavior). Processing may continue with block 318, as the selected behavioral detector will continuously monitor the counter data reserved for the selected behavioral detector until deactivated by the SW process that activated it.

In parallel with the continuous monitoring of the assigned counters by the activated selected behavioral detector, the SW process 302 reads the BD runtime MSRs 212 to identify the selected behavioral detector that triggered the interrupt. At block 328, the SW process 302 then executes a SW response. In an embodiment, the SW process 302 (such as the OS) may derive the process identifier (ID) of another SW process being executed that caused the matched behavior so that the SW process can take SW-specific actions regarding the identified SW process.

Figure 4:
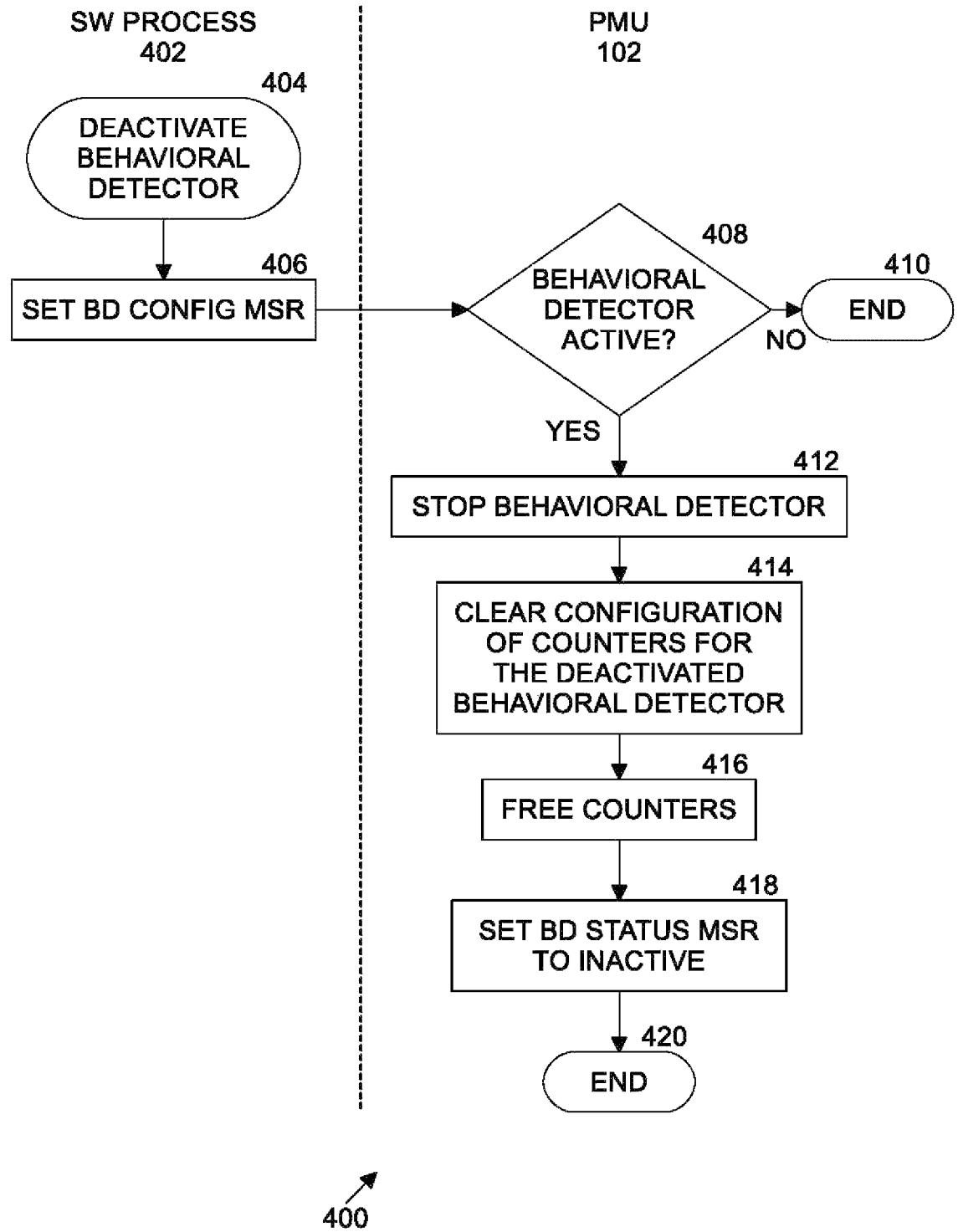
FIG. 4 is a flow diagram of deactivating automatic profiling processing according to some embodiments.

FIG. 4 is a flow diagram of deactivating automatic profiling processing 400 according to some embodiments. At block 404, a SW process 402 (such as SW 1 110, SW 2 112, . . . SW M 114 of FIG. 1) seeks to deactivate a selected behavioral detector in the PMU 102. At block 406, the SW process communicates with behavioral detector manager 206 of PMU 102 to clear a BD configuration (config) MSR 210 associated with the behavioral detector to be deactivated. Behavioral detector manager 206 determines, at block 408, whether the selected behavioral detector is active. If the selected behavioral detector is not active, then deactivation processing ends at block 410. If the selected behavioral detector is active, then at block 412 the behavioral detector manager 206 stops the selected behavioral detector. In an embodiment, stopping the selected behavioral detector may also include close an ML inference session in an ML accelerator or other IP block 220. At block 414, behavioral detector manager 206 clears the configuration of counters for the deactivated behavioral detector. At block 416, the behavioral detector manager frees the counters that were assigned to the deactivated behavioral detector. At block 418, the behavioral detector manager 206 sets the BD status MSR for the deactivate behavioral detector to inactive. Deactivation processing ends at block 420.

Embodiments provide improvements to the PMU of a processor for in-HW and in-System on a Chip (SoC) workload and malware detection. Being able to profile and identify popular application activity (e.g., video play, gaming, word editing, and dangerous malware activity, such as ransomware), efficiently and securely in a HW block itself, that is in a processor IP block, enables innovative capabilities. For example, the processor or system SW can automatically tune SoC performance parameters to improve execution for the dominant activity currently occurring in the processing system with minimal overhead. Similarly, antivirus (AVR) or endpoint detection and response (EDR) SW can receive signals directly from the processor if a profiled malware activity, such as ransomware, execution is detected and can take quick action. This can help make computing systems including processors having the PMU described support improved performance and be less susceptible to attacks such as ransomware and side channel attacks.

Threat profiling and monitoring SW (such as anti-virus (AV), endpoint platform protection (EPP), and EDR)) can use the capability described herein to securely and predictably monitor for malicious, as well as anomalous, activities with PMU telemetry data being collected by the processor. Counter data can be collected in secure containers (e.g., such as like Intel® Software Guard Extensions (SGX) and Intel® Trust Domain Extensions (TDX) with tamper protection for processing. For example, this technology improves the security of solutions such as Intel® Threat Detection Technology (TDT) that depends on untampered and consistent PMU configurations and counter data.

Figure 5:
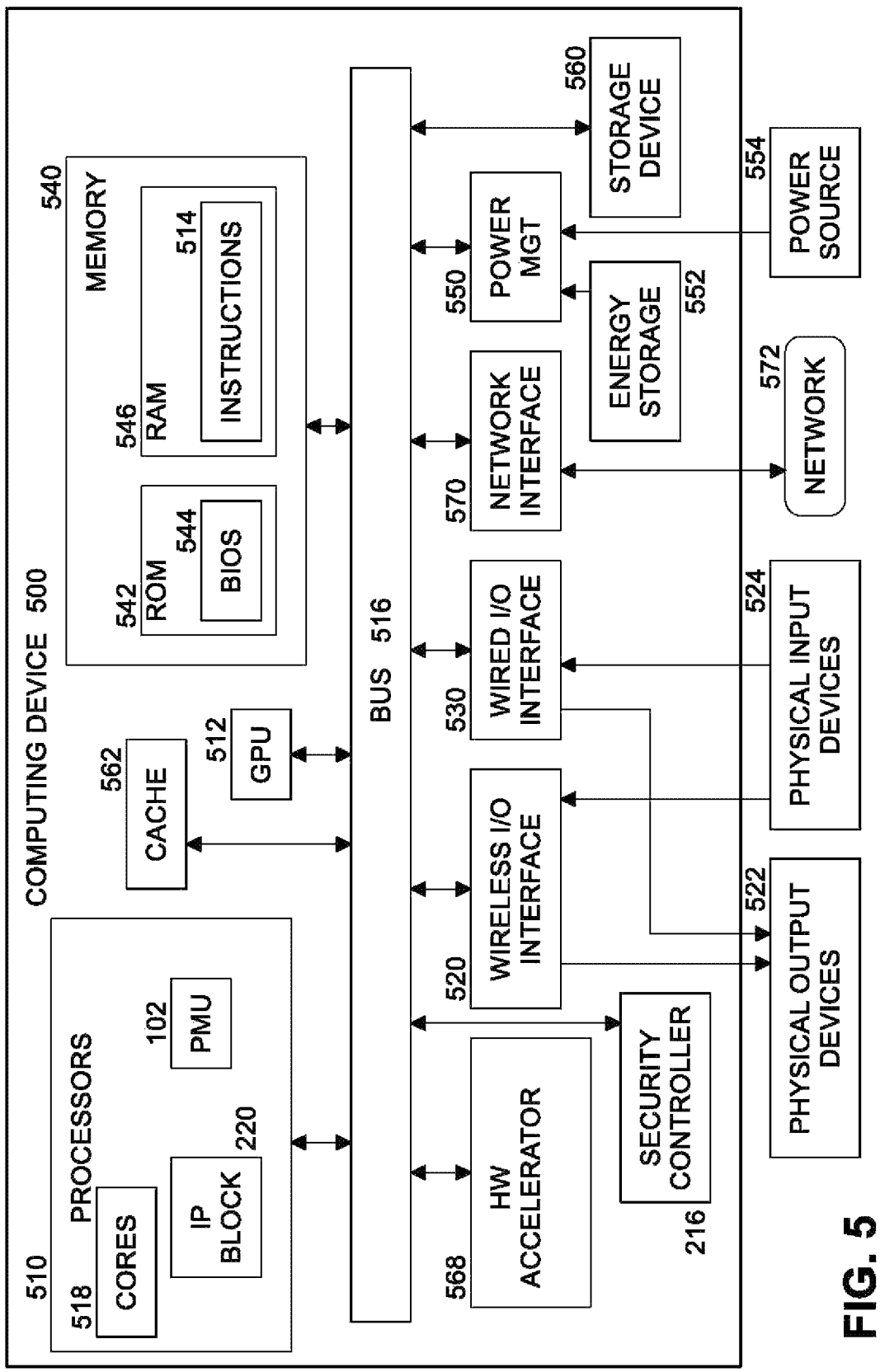
FIG. 5 is a schematic diagram of an illustrative electronic computing device to perform automatic profiling processing according to some embodiments.

FIG. 5 is a schematic diagram of an illustrative electronic computing device to perform security processing according to some embodiments. In some embodiments, computing device 500 includes one or more processors 510 including PMU 102. In some embodiments, the computing device 500 includes one or more hardware accelerators 568.

In some embodiments, the computing device is to implement security processing, as provided in FIGS. 1-4 above.

The computing device 500 may additionally include one or more of the following: cache 562, a graphical processing unit (GPU) 512 (which may be the hardware accelerator in some implementations), a wireless input/output (I/O) interface 520, a wired I/O interface 530, system memory 540, power management circuitry 580, non-transitory storage device 560, and a network interface 570 for connection to a network 572. The following discussion provides a brief, general description of the components forming the illustrative computing device 500. Example, non-limiting computing devices 500 may include a desktop computing device, blade server device, workstation, laptop computer, mobile phone, tablet computer, personal digital assistant, or similar device or system.

In embodiments, the processor cores 518 are capable of executing machine-readable instruction sets 514, reading data and/or machine-readable instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 514 may include instructions to implement security processing, as provided in FIGS. 1-4.

The processor cores 518 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500 includes a bus 516 or similar communications link that communicably couples and facilitates the exchange of information and/or data between various system components including the processor cores 518, the cache 562, the graphics processor circuitry 512, one or more wireless I/O interface 520, one or more wired I/O interfaces 530, one or more storage devices 560, and/or one or more network interfaces 570. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 518 may include any number, type, or combination of currently available or future developed devices capable of executing machine-readable instruction sets.

The processor cores 518 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits ("ASICs"), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the computing device 500 may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500, for example by causing the processor cores 518 to load and/or execute one or more machine-readable instruction sets 514. In embodiments, at least some of the one or more machine-readable instruction sets 514 cause at least a portion of the processor cores 518 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to universal serial bus (USB), IEEE 1394 ("Fire-Wire"), and similar.

The computing device 500 may include one or more communicably coupled, non-transitory, storage devices 560. The storage devices 560 may include one or more hard disk drives (HDDs) and/or one or more solid-state storage devices (SSDs). The one or more storage devices 560 may include any current or future developed storage appliances, network storage devices, and/or systems. Non-limiting examples of such storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 560 may include one or more removable storage devices, such as one or more flash drives, flash memories, flash storage units, or similar appliances or devices capable of communicable coupling to and decoupling from the computing device 500.

The one or more storage devices 560 may include interfaces or controllers (not shown) communicatively coupling the respective storage device or system to the bus 516. The one or more storage devices 560 may store, retain, or otherwise contain machine-readable instruction sets, data structures, program modules, data stores, databases, logical structures, and/or other data useful to the processor cores 518 and/or graphics processor circuitry 512 and/or one or more applications executed on or by the processor cores 518 and/or graphics processor circuitry 512. In some instances, one or more data storage devices 560 may be communicably coupled to the processor cores 518, for example via the bus 516 or via one or more wired communications interfaces 530 (e.g., Universal Serial Bus or USB); one or more wireless communications interface 520 (e.g., Bluetooth®, Near Field Communication or NFC); and/or one or more network interfaces 570 (IEEE 802.3 or Ethernet, IEEE 802.11, or Wi-Fi®, etc.).

Machine-readable instruction sets 514 and other programs, applications, logic sets, and/or modules may be stored in whole or in part in the system memory 540. Such machine-readable instruction sets 514 may be transferred, in whole or in part, from the one or more storage devices 560. The machine-readable instruction sets 514 may be loaded, stored, or otherwise retained in system memory 540, in whole or in part, during execution by the processor cores 518 and/or graphics processor circuitry 512.

The computing device 500 may include power management circuitry 580 that controls one or more operational aspects of the energy storage device 582. In embodiments, the energy storage device 582 may include one or more primary (i.e., non-rechargeable) or secondary (i.e., rechargeable) batteries or similar energy storage devices. In embodiments, the energy storage device 582 may include one or more supercapacitors or ultracapacitors. In embodiments, the power management circuitry 580 may alter, adjust, or control the flow of energy from an external power source 584 to the energy storage device 582 and/or to the computing device 500. The external power source 584 may include, but is not limited to, a solar power system, a commercial electric grid, a portable generator, an external energy storage device, or any combination thereof.

For convenience, the processor cores 518, the graphics processor circuitry 512, the wireless I/O interface 520, the wired I/O interface 530, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 518 and/or the graphics processor circuitry 512. In some embodiments, all or a portion of the bus 516 may be omitted and the components are coupled directly to each other using suitable wired or wireless connections.

Flow charts representative of example hardware logic, machine readable instructions, hardware implemented state machines, and/or any combination thereof for implementing computing device 500, for example, are shown in FIGS. 3-4. The machine-readable instructions may be one or more executable programs or portion(s) of an executable program for execution by a computer processor such as the processor 510 shown in the example computing device 500 discussed above in connection with FIG. 5. The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flow charts illustrated in FIGS. 3-4, many other methods of implementing the example computing device 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is a processor including one or more processing cores, and a performance monitoring unit (PMU), the PMU including one or more performance monitoring counters; and a behavioral detector to sample data from a set of the one or more performance monitoring counters, analyze the sampled data, and identify a type of workload of a software process being executed by the processor.

In Example 2, the subject matter of Example 1 can optionally include an intellectual property (IP) block including a machine learning process to analyze the sampled data and identify the type of workload of the software process being executed by the processor.

In Example 3, the subject matter of Example 2 can optionally include one or more configuration model specific registers (MSRs); and a behavioral detector manager to read a configuration MSR associated with the behavioral detector and to activate the behavioral detector when the configuration MSR is set.

In Example 4, the subject matter of Example 3 can optionally include wherein the behavioral detector manager is to update a runtime MSR associated with the behavioral detector to indicate the type of workload of the software process is identified.

In Example 5, the subject matter of Example 3 can optionally include wherein the behavioral detector manager to determine if the set of the one or more performance monitoring counters are available and assign the set of the one or more performance monitoring counters to the behavioral detector when available.

In Example 6, the subject matter of Example 5 can optionally include wherein the behavioral detector manager is to program the assigned set of the one or more performance monitoring counters to record data relating to events needed by the behavioral detector to identify the workload.

In Example 7, the subject matter of Example 5 can optionally include wherein the PMU comprises one or more status model specific registers (MSRs) and the behavioral detector manager is to set a status MSR associated with the behavioral detector to indicate activation.

In Example 8, the subject matter of Example 7 can optionally include wherein the behavioral detector manager is to read the configuration MSR associated with the behavioral detector and to deactivate the behavioral detector when the configuration MSR is cleared.

In Example 9, the subject matter of Example 7 can optionally include wherein the behavioral detector manager is to free the set of the one or more performance monitoring counters from being assigned to the behavioral detector and to set the status MSR associated with the behavioral detector to indicate deactivation.

In Example 10, the subject matter of Example 1 can optionally include wherein the PMU to execute a response to identifying the type of workload of the software process.

In Example 11, the subject matter of Example 10 can optionally include wherein the type of workload for the software process is malware.

In Example 12, the subject matter of Example 10 can optionally include wherein executing the response comprises tuning one or more parameters of the processor.

In Example 13, the subject matter of Example 10 can optionally include wherein executing the response comprises generating a performance monitoring interrupt (PMI) and handling of the PMI results in termination of the software process.

Example 14 is a method including sampling data from a set of one or more performance monitoring counters by a behavioral detector in a performance monitoring unit (PMU) of a processor; analyzing the sampled data by the behavioral detector, and identifying, by the behavioral detector, a type of workload of a software process being executed by the processor.

In Example 15, the subject matter of Example 14 can optionally include reading, by a behavioral detector manager of the PMU, a configuration model specific register (MSR) associated with the behavioral detector; and activating the behavioral detector when the configuration MSR is set.

In Example 16, the subject matter of Example 15 can optionally include updating a runtime MSR associated with the behavioral detector to indicate the type of workload of the software process is identified.

In Example 17, the subject matter of Example 15 can optionally include determining if the set of the one or more performance monitoring counters are available and assigning the set of the one or more performance monitoring counters to the behavioral detector when available.

In Example 18, the subject matter of Example 17 can optionally include programming the assigned set of the one or more performance monitoring counters to record data relating to events needed by the behavioral detector to identify the workload.

In Example 19, the subject matter of Example 17 can optionally include setting a status MSR associated with the behavioral detector to indicate activation.

In Example 20, the subject matter of Example 19 can optionally include reading the configuration MSR associated with the behavioral detector and deactivating the behavioral detector when the configuration MSR is cleared.

In Example 21, the subject matter of Example 19 can optionally include freeing the set of the one or more performance monitoring counters from being assigned to the behavioral detector and setting the status MSR associated with the behavioral detector to indicate deactivation.

In Example 22, the subject matter of Example 14 can optionally include executing a response to identifying the type of workload of the software process.

In Example 23, the subject matter of Example 22 can optionally include wherein executing the response comprises tuning one or more parameters of the processor.

Example 24 is at least one non-transitory machine-readable storage medium comprising instructions that, when executed, cause at least one processing device to at least sample data from a set of one or more performance monitoring counters by a behavioral detector in a performance monitoring unit (PMU) of a processor; analyze the sampled data by the behavioral detector, and identify, by the behavioral detector, a type of workload of a software process being executed by the processor.

In Example 25, the subject matter of Example 24 can optionally include at least one non-transitory machine-readable storage medium of example 24, comprising instructions that, when executed, cause at least one processing device to at least read, by a behavioral detector manager of the PMU, a configuration model specific register (MSR) associated with the behavioral detector; and activate the behavioral detector when the configuration MSR is set.

In Example 26, the subject matter of Example 25 can optionally include at least one non-transitory machine-readable storage medium of eaxmple 25, comprising instructions that, when executed, cause at least one processing device to at least determine if the set of the one or more performance monitoring counters are available and assigning the set of the one or more performance monitoring counters to the behavioral detector when available.

In Example 27, the subject matter of Example 26 can optionally include at least one non-transitory machine-readable storage medium of example 26, comprising instructions that, when executed, cause at least one processing device to at least program the assigned set of the one or more performance monitoring counters to record data relating to events needed by the behavioral detector to identify the workload.

In Example 28, the subject matter of Example 24 can optionally include at least one non-transitory machine-readable storage medium of example 24, comprising instructions that, when executed, cause at least one processing device to at least execute a response to identifying the type of workload of the software process.

In Example 29, the subject matter of Example 28 can optionally include at least one non-transitory machine-readable storage medium of example 28, wherein executing the response comprises tuning one or more parameters of the processor.

Example 30 provides an apparatus comprising means for performing the method of any one of Examples 14-23.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A processor comprising:
   one or more processing cores,
   a performance monitoring unit (PMU), the PMU including
     one or more performance monitoring counters;
     a behavioral detector to sample data from a set of the one or more performance monitoring counters, analyze the sampled data, and identify a type of workload of a software process being executed by the processor; and
     a behavioral detector manager to read a configuration associated with the behavioral detector, to activate the behavioral detector when the configuration is set, and to update a runtime register associated with the behavioral detector to indicate the type of workload of the software process; and
   an intellectual property (IP) block including a machine learning process to analyze the sampled data and identify the type of workload of the software process being executed by the processor.

2. The processor of claim 1, wherein the register is a model specific register (MSR).

3. The processor of claim 2, wherein the behavioral detector manager is to update a runtime MSR associated with the behavioral detector to indicate the type of workload of the software process that is identified.

4. The processor of claim 2, wherein the behavioral detector manager to determine if the set of the one or more performance monitoring counters are available and assign the set of the one or more performance monitoring counters to the behavioral detector when available.

5. The processor of claim 4, wherein the behavioral detector manager is to program the assigned set of the one or more performance monitoring counters to record data relating to events needed by the behavioral detector to identify the workload.

6. The processor of claim 4, wherein the PMU comprises one or more status model specific registers (MSRs) and the behavioral detector manager is to set a status MSR associated with the behavioral detector to indicate activation.

7. The processor of claim 6, wherein the behavioral detector manager is to read the configuration MSR associated with the behavioral detector and to deactivate the behavioral detector when the configuration MSR is cleared.

8. The processor of claim 6, wherein the behavioral detector manager is to free the set of the one or more performance monitoring counters from being assigned to the behavioral detector and to set the status MSR associated with the behavioral detector to indicate deactivation.

9. The processor of claim 1, the PMU to execute a response to identifying the type of workload of the software process.

10. The processor of claim 9, wherein the type of workload for the software process is malware.

11. The processor of claim 9, wherein executing the response comprises tuning one or more parameters of the processor.

12. The processor of claim 9, wherein executing the response comprises generating a performance monitoring interrupt (PMI) and handling of the PMI results in termination of the software process.

13. A method comprising:
    sampling data from a set of one or more performance monitoring counters by a behavioral detector in a performance monitoring unit (PMU) of a processor;
    analyzing the sampled data by the behavioral detector,
    identifying, by the behavioral detector, a type of workload of a software process being executed by the processor;
    reading, by a behavioral detector manager of the PMU, a configuration model specific register (MSR) associated with the behavioral detector; and
    activating the behavioral detector when the configuration MSR is set.

14. The method of claim 13, comprising:
    updating a runtime MSR associated with the behavioral detector to indicate the type of workload of the software process is identified.

15. The method of claim 13, comprising:
    determining if the set of the one or more performance monitoring counters are available and assigning the set of the one or more performance monitoring counters to the behavioral detector when available.

16. The method of claim 15, comprising:
programming the assigned set of the one or more performance monitoring counters to record data relating to events needed by the behavioral detector to identify the workload.

17. The method of claim 15, comprising:
setting a status MSR associated with the behavioral detector to indicate activation.

18. The method of claim 17, comprising:
reading the configuration MSR associated with the behavioral detector and deactivating the behavioral detector when the configuration MSR is cleared.

19. The method of claim 17, comprising:
freeing the set of the one or more performance monitoring counters from being assigned to the behavioral detector and setting the status MSR associated with the behavioral detector to indicate deactivation.

20. The method of claim 13, comprising:
executing a response to identifying the type of workload of the software process.

21. The method of claim 20, wherein executing the response comprises tuning one or more parameters of the processor.

\* \* \* \* \*